United States Patent
Peemans et al.

(10) Patent No.: US 7,122,613 B1
(45) Date of Patent: Oct. 17, 2006

(54) METHOD FOR THE PRODUCTION OF POLYCARBONATES

(75) Inventors: Rudy Francois Alain Jos Peemans, Erps-Kwerps (BE); Eugène Theodorus Wilhelmus Maria Schipper, Haarlem (NL); Hendricus Franciscus Zirkzee, Schore (NL); Jan Henk Kamps, Bergen op Zoom (NL)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/248,147

(22) Filed: Dec. 20, 2002

(51) Int. Cl.
*C08G 64/00* (2006.01)

(52) U.S. Cl. .................. 528/196; 528/196; 528/198
(58) Field of Classification Search ............... 528/196, 528/198
See application file for complete search history.

(56) References Cited

U.S. PATENT DOCUMENTS

| | | | |
|---|---|---|---|
| 4,217,438 A | 8/1980 | Brunelle et al. | |
| 4,362,829 A | 12/1982 | Cooper et al. | |
| 4,677,183 A | 6/1987 | Mark, deceased et al. | |
| 4,737,573 A | 4/1988 | Silva et al. | |
| 4,857,628 A | 8/1989 | Petri | |
| 4,973,664 A | 11/1990 | Silva | |
| 5,597,887 A | 1/1997 | King, Jr. et al. | |
| 5,864,006 A * | 1/1999 | Ormand et al. | 528/196 |
| 5,922,826 A * | 7/1999 | Kuze et al. | 528/196 |
| 5,962,558 A | 10/1999 | Rosenquist | |
| 6,140,457 A | 10/2000 | LeGrand et al. | |
| 6,399,738 B1 * | 6/2002 | Ito | 528/196 |

OTHER PUBLICATIONS

Textbook of Polymer Science by F. W. Billmeyer, Publisher John Wiley and Sons (1984) pp. 33–46.
Introduction to Polymers, Second Edition, R.J. Young and P.A. Lovell; pp. 22–25.

* cited by examiner

*Primary Examiner*—Terressa Boykin

(57) ABSTRACT

A method for the manufacture of a polycarbonate which comprises reacting a carbonate precursor with a dihydroxy compound in the presence of an aqueous base in an inert organic solvent optionally containing a molecular weight regulator to form an oligomeric polycarbonate, wherein the reaction between the dihydroxy compound and the carbonate precursor is about 80 to about 99% completed; removing the inert organic solvent and the aqueous base to isolate the oligomeric polycarbonate; and transesterifying the isolated oligomeric polycarbonate to form a polymeric polycarbonate at a temperature and pressure effective to remove trace amounts of residual solvent. This method eliminates some of the problems of the prior art such as the removal of solvent from high molecular weight polycarbonate, which is both cumbersome, energy intensive and expensive.

33 Claims, 2 Drawing Sheets

METHOD FOR THE PRODUCTION OF POLYCARBONATES

BACKGROUND

This disclosure relates to method for the production of polycarbonates. Aromatic polycarbonates are well-known thermoplastic materials, which are in wide use as engineering plastics in many fields because of their excellent mechanical properties, for example high impact resistance, heat resistance, flexibility, and transparency.

Conventional industrial plants synthesize polycarbonates by interfacial polymerization, i.e., by mixing together an aqueous solution of an aromatic dihydroxy compound with an organic solution of a carbonate precursor such as phosgene. Upon mixing the immiscible organic and aqueous phases, the dihydroxy compound reacts with the carbonate precursor at the phase interface. Typically, a phase transfer catalyst, such as a tertiary amine, is added to the aqueous phase to enhance the reaction.

The interfacial method for making polycarbonate has several inherent disadvantages. Plant capacity and product quality are often limited by the need to separate the organic and aqueous phases, which can be difficult due to the high viscosity of the organic phase (which contains the dissolved high molecular weight polycarbonate products). Isolation of the polycarbonate is also problematic, as complete removal of the organic solvent from the thick, viscous polycarbonate product requires expensive techniques such as solvent interchange (e.g., with monochlorobenzene), evaporative extrusion or steam precipitation followed by several drying steps. Accordingly, there remains a need in the art for more efficient and effective methods for the large-scale production of polycarbonates involving interfacial polymerization.

SUMMARY

A method for the continuous manufacture of a polycarbonate which comprises reacting a carbonate precursor with a dihydroxy compound in the presence of an aqueous base in an inert organic solvent optionally containing a molecular weight regulator to form an oligomeric polycarbonate, wherein the extent of reaction between the dihydroxy compound and the carbonate precursor is from about 80 to about 99% completed; removing the inert organic solvent and the aqueous base to isolate the oligomeric polycarbonate; transesterifying the isolated oligomeric polycarbonate to form a polymeric polycarbonate at a temperature and pressure effective to remove trace amounts of residual solvent. This method eliminates some of the problems of the prior art such as the removal of solvent from high molecular weight polycarbonate, which is cumbersome, energy intensive, and expensive.

DETAILED DESCRIPTION OF PREFERRED EMBODIMENTS

Figure 1:
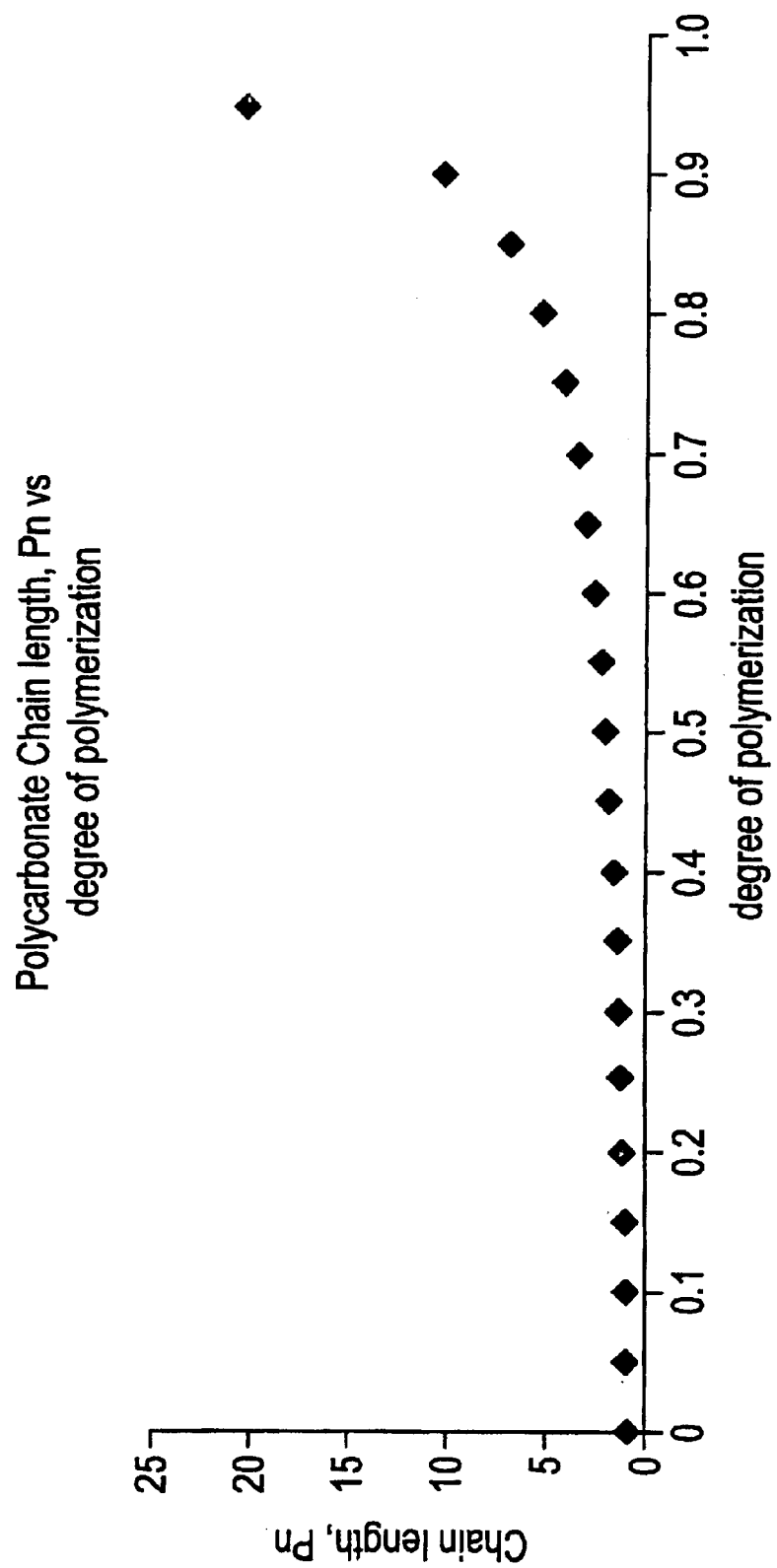
FIG. 1 is a graph showing the relationship between mean chain length ($P_n$) and degree of polymerization. For example the number average molecular weight $M_n=P_n\times 254$ where the molecular weight of the polycarbonate repeat unit is 254.

An improved method for the interfacial production of polycarbonates comprises arresting the normal interfacial reaction prior to full polymerization, isolating the oligomeric polycarbonate products, and subsequently completing polymerization of the isolated, oligomeric polycarbonate products. This sequence allows for the easy separation of aqueous and organic phases, as well as complete separation of the organic solvent from the final product. It has been unexpectedly found by the inventors hereof that the efficiencies attendant upon isolation of oligomeric products, as compared to fully polymeric products, fully compensates for the need for a two-step polymerization, producing cleaner polymeric products with greater efficiency. In a preferred embodiment, the initial interfacial polymerization, isolation and final polymerization is a continuous process.

As used herein, the terms "polycarbonate", "polycarbonate composition", and "composition comprising aromatic carbonate chain units" includes compositions having structural units of the formula (I):

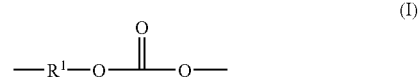

in which at least about 60 percent of the total number of $R^1$ groups are aromatic organic radicals and the balance thereof are aliphatic, alicyclic, or aromatic radicals.

Preferably, $R^1$ is an aromatic organic radical and, more preferably, a radical of the formula (II):

wherein each of $A^1$ and $A^2$ is a monocyclic, divalent aryl radical and $Y^1$ is a bridging radical having one or two atoms which separate $A^1$ from $A^2$. In an exemplary embodiment, one atom separates $A^1$ from $A^2$. Illustrative non-limiting examples of radicals of this type are —O—, —S—, —S(O)—, —S(O$_2$)—, —C(O)—, methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ can be a hydrocarbon group or a saturated hydrocarbon group such as methylene, cyclohexylidene or isopropylidene.

Polycarbonates can be produced by the Schotten-Bauman Interfacial reaction of the carbonate precursor with dihydroxy compounds. Typically, an aqueous base such as (e.g., sodium hydroxide, potassium hydroxide, calcium hydroxide, and the like,) is mixed with an organic, water immiscible solvent such as benzene, toluene, carbon disulfide, or dichloromethane, which contains the dihydroxy compound. A phase transfer agent is generally used to facilitate the reaction. Molecular weight regulators may be added either singly or in admixture to the reactant mixture. Branching agents, described forthwith may also be added singly or in admixture As used herein, the term "dihydroxy compound" includes, for example, bisphenol compounds having general formula (III) as follows:

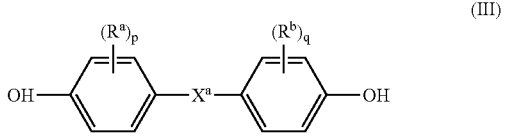

(III)

wherein $R^a$ and $R^b$ each represent a halogen atom, for example chlorine or bromine, or a monovalent hydrocarbon group, preferably having from 1 to 10 carbon atoms, and may be the same or different; p and q are each independently integers from 0 to 4: Preferably, $X^a$ represents one of the groups of formula (IV):

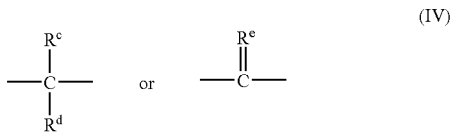

(IV)

wherein $R^c$ and $R^d$ each independently represent a hydrogen atom or a monovalent linear or cyclic hydrocarbon group and $R^e$ is a divalent hydrocarbon group.

Some illustrative, non-limiting examples of suitable dihydroxy compounds include the dihydroxy-substituted aromatic hydrocarbons disclosed by name or formula (generic or specific) in U.S. Pat. No. 4,217,438, which is incorporated herein by reference. A nonexclusive list of specific examples of the types of bisphenol compounds that may be represented by formula (III) includes 1,1-bis(4-hydroxyphenyl) methane; 1,1 -bis(4-hydroxyphenyl) ethane; 2,2-bis(4-hydroxyphenyl) propane (hereinafter "bisphenol A" or "BPA"); 2,2-bis(4-hydroxyphenyl) butane; 2,2-bis(4-hydroxyphenyl) octane; 1,1-bis(4-hydroxyphenyl) propane; 1,1-bis(4-hydroxyphenyl) n-butane; bis(4-hydroxyphenyl) phenylmethane; 2,2-bis(4-hydroxy-1-methylphenyl) propane; 1,1-bis(4-hydroxy-t-butylphenyl) propane; bis (hydroxyaryl) alkanes such as 2,2-bis(4-hydroxy-3-bromophenyl) propane; 1,1-bis(4-hydroxyphenyl) cyclopentane; and bis(hydroxyaryl) cycloalkanes such as 1,1-bis(4-hydroxyphenyl) cyclohexane. Two or more different dihydric phenols may also be used.

Typical carbonate precursors include the carbonyl halides, for example carbonyl chloride (phosgene), and carbonyl bromide; the bis-haloformates, for example the bis-haloformates of dihydric phenols such as bisphenol A, hydroquinone, and the like, and the bis-haloformates of glycols such as ethylene glycol and neopentyl glycol; and the diaryl carbonates, such as diphenyl carbonate, di(tolyl) carbonate, and di(naphthyl) carbonate.

Typical branching agents such as α, α, α', α'-tetrakis(3-methyl-4-hydroxyphenyl)-p-xylene, α, α, α', α'-tetrakis(2-methyl-4-hydroxyphenyl)-p-xylene, α, α, α', α'-tetrakis(2,5 dimethyl-4-hydroxyphenyl)-p-xylene, α, α, α', α'-tetrakis (2,6 dimethyl-4-hydroxyphenyl)-p-xylene, α, α, α', α'-tetrakis(4-hydroxyphenyl)-p-xylene, and the like, can also be added to the reaction mixture.

Some illustrative, non-limiting examples of suitable phase transfer reagents include, but are not limited to, tertiary amines such as triethylamine, quaternary ammonium compounds, and quaternary phosphonium compounds.

Molecular weight regulators or chain stoppers are optional and are added to the mixture in order to arrest the progress of the polymerization. Typical molecular weight regulators such as phenol, chroman-1, p-t-butylphenol, p-bromophenol, para-cumyl-phenol, and the like may be added either singly or in admixture and are typically added in an amount of about 1 to about 10 mol % excess with respect to the BPA.

In a preferred embodiment, a molar excess of about 1 to abut 10 weight percent (wt %) of a molecular weight regulator such as phenol is added based n the total weight of the hydroxy compound. Any monofunctional phenol or alcohol with a boiling point lower than BPA or lower than diphenyl carbonate (hereinafter referred to as DPC) can be added as a chain stopper in the Schotten Baumann step. This will produce a low molecular weight mixture of PC oligomers, BPA oligomers, BPA, DPC and free phenol (depending on the excess of phosgene used). After removal of the residual solvent and aqueous base, the oligomeric mixture can be sent through a transesterification reactor to form completely polymerized polycarbonates.

In an important feature of the present method, the progress of the interfacial polymerization is arrested after oligomerization, wherein the reaction has progressed from about 80% to about 99% completion. It should be noted that the terms "extent of reaction" and "degree of polymerization" can be used interchangeably to reflect the progress of the reaction. Even at 99% completion, the mean chain lengths $P_n$ of the oligomeric products is generally less than about 30, preferably less than about 20, but more than about 5. This is due to the stepwise nature of the polymerization and is described in detail in the Textbook of Polymer Science by F. W. Billmeyer, John Wiley And Sons (1984). It is also clearly depicted in FIG. 1, where it can be seen that the average chain length $P_n$ increases exponentially as the degree of polymerization increases above 0.8. Suitable methods for controlling the mean chain length during the Schotten Baumann step of the reaction may be by weighing the amount of BPA, molecular weight regulator added at the beginning of the reaction, and metering in a fixed quantity of phosgene based on BPA and chain stopper weight.

While interfacial polymerization is the most common commercial method for the production of polycarbonates, the present method is of utility in other manufacturing methods that produce polycarbonates that must be separated from organic solutions.

Because arresting the polymerization results in the formation of oligomeric, rather than fully polymeric condensation products, the viscosity of the organic phase comprising oligomeric product is accordingly significantly less than the viscosity of the organic phase wherein full polymerization has occurred. This results in more efficient handling of the organic phase comprising oligomeric product, and renders solvent removal more efficient. Therefore, rather than using expensive techniques such as evaporative extrusion or steam precipitation followed by several drying steps, the organic phase comprising oligomers may be separated from the aqueous phase by either simple decanting or centrifuging, and may optionally be washed to remove reaction by-products. The method of separation of the aqueous phase from the organic phase comprising oligomers is not limited in anyway to the above-mentioned simple processes.

The washed solution can then be treated with a stoichiometric quantity or slight excess of DPC and a transesterification catalyst, in a polymerization reactor to convert the oligomeric species to high molecular weight polymers. Transesterification catalysts are known in the art, and include but are not limited to basic catalysts such as sodium hydroxide (NaOH), lithium hydride (LiH), and acidic catalysts such as sodium dihydrogen phosphite ($NaH_2PO_3$) and caesium dihydrogen phosphate ($CsH_2PO_4$). Other suitable transesterification catalysts are tetraorganophosphonium carboxylic acid salts or derivatives thereof. Examples of suitable tetraorganophosphonium carboxylic acid salts or derivatives thereof include, but are not limited to tetramethylphosphonium acetate, tetraethylphosphonium acetate, tetrapropylphosphonium acetate, tetrabutylphosphonium acetate, tetrapentylphosphonium acetate, tetrahexylphosphonium acetate, tetraheptylphosphonium acetate, tetraoctylphosphonium acetate, tetradecylphosphonium acetate, tetradodecylphosphonium acetate, tetratolylphosphonium acetate, tetraphenylphosphonium acetate, tetramethylphosphonitumn benzoate, tetraethylphosphonium benzoate, tetrapropylphosphonium benzoate, tetraphenylphosphonium benzoate, tetramethylphosphonium formate, tetraethylphosphonium formate, tetrapropylphosphonium formate, tetraphenylphosphonium formate, tetramethylphosphonium propionate, tetraethylphosphonium propionate, tetrapromyiphosphonium propionate, tetramethylphosphonium butyrate, tetraethylphosphonium butyrate, and tetrapropylphosphonium butyrate; and combinations comprising at least one of the foregoing. The catalysts may be added in amounts suitable to effect transesterification. The catalyst is generally added in an amount of about $1 \times 10^{-9}$ to about $1 \times 10^{-4}$ moles/mole of oligomeric polycarbonate. The catalyst may preferably be added in amounts of greater than or equal to about $1 \times 10^{-8}$ more preferably greater than or equal to about $1 \times 10^{-7}$ moles/mole of oligomeric polycarbonate. The catalyst may also preferably be added in amounts of less than or equal to about $1 \times 10^{-5}$ moles/mole of oligomeric polycarbonate.

The temperature and pressure during transesterification are then adjusted so as to optimize the molecular weight of the resultant polycarbonate. In an advantageous feature, the temperatures and pressures used to effect transesterification are also effective to remove the solvent used during the interfacial condensation.

The preferred temperatures for transesterification are from about 210° C. to about 310° C., most preferably around 270° C. The preferred pressures are generally reduced, less than about 20 millimeters (mm) mercury preferably from about 0.2 to about 20 mm mercury.

In another embodiment, an end-capping agent can be added to the transesterification reactor in a stoichiometric quantity or slight excess, so a desired extent of polymerization is reached. Endcap agents may be derived from a di-t-alkylphenol as described in U.S. Pat. No. 6,140,457, which is incorporated herein by reference. End-cap agents such as 3-(2H-benzotriazol-2-yl)-5-(1,1-dimethylethyl)-4-hydroxy-benzene-propanoic acid or structural variants thereof can also be utilized and are described in U.S. Pat. No. 5,962,S58 which is incorporated herein by reference.

Figure 2:
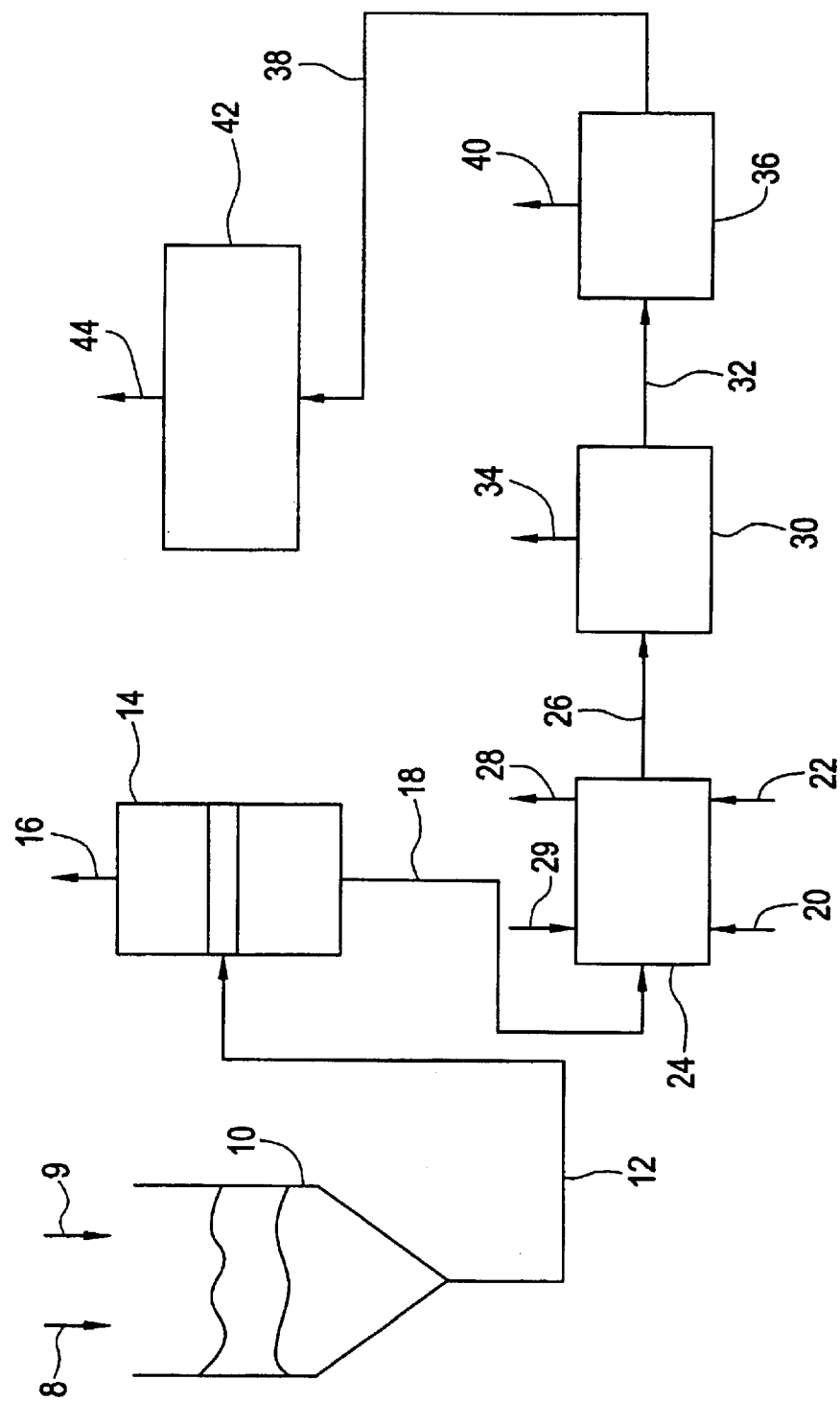
FIG. 2 is a schematic representation of an improved process for the production of polycarbonates.

Referring now to FIG. 2, an illustrative, non-limiting block flow diagram representing the process steps for the production of polycarbonate is provided. A reactor 10 is a continuous or batch interfacial reactor. A solution 8 containing a carbonate precursor (e.g., phosgene) and a solution 9 containing a dihydroxy compound or compounds (e.g., bisphenol compounds) are introduced in to reactor 10. The resulting oligomeric reaction product flow 12 is introduced into a phase separator 14, wherein an aqueous phase 16 is removed and the organic phase 18 is optionally washed and isolated.

The washed solution 18 is then treated with a stoichiometric quantity or slight excess of diphenyl carbonate indicated by flow 20, together with a transesterification catalyst indicated by catalyst feed 22, in a polymerization reactor 24. The temperature and pressure during transesterification are then adjusted so as to optimize the molecular weight of the resultant polycarbonates indicated by polycarbonate flow 26. In an advantageous feature, the temperatures and pressures used to effect transesterification are also effective to remove the solvent (e.g., via a solvent flow 28) used during the interfacial condensation. As an optional process step, interfacial solvent is removed via solvent outlet flow 28 and higher boiling point solvent is introduced via a solvent inlet flow 29.

Multi-staged reactions facilitate processing of comparatively low viscosity oligomeric product and low molecular weight polymeric product, rather than removing the aqueous phase and organic solvent from a high viscosity, high molecular weight polymeric product. In a multistage process, polycarbonate flow 26 is further introduced into an additional polymerization reactor 30. Optionally, additional transesterification catalyst can be introduced. The pressure and temperatures are further optimized to generate the desired molecular weight of the polycarbonate exiting at polycarbonate flow 32 and optionally to remove solvent via a solvent flow 34.

In another preferred embodiment, polycarbonate flow 32 can be further introduced into an additional polymerization reactor 36, wherein an optional transesterification catalyst can be introduced. The pressure and temperatures are again optimized to generate the desired molecular weight of the polycarbonate exiting at polycarbonate flow 38 and optionally to remove solvent via a solvent flow 40. An end-capping agent can be added to any one or more of the transesterification reactors 24, 30, 36, in a stoichiometric quantity or slight excess, so a desired extent of polymerization is reached.

For final processing, polycarbonate flow 38 is extruded via one or more extruders 42 and exits as a highly viscous polycarbonate product 44. In another alternative embodiment, the organic solvent used in the interfacial process may be removed, for example by evaporation, and replaced with a higher boiling solvent having a boiling point greater than about 50° C., in any one of reactors 24, 30 or 36 or all of them if so desired. The higher boiling point solvent could be phenol or a blend of phenol with DPC or a blend of phenol with DPC and BPA and is generally added in an amount of about 10 to about 100 wt % based on the total weight of the oligomeric polycarbonate. Within this range it is generally desirable to add an amount of solvent greater than or equal to about 20, preferably greater than or equal to about 30 wt % of the total weight of the oligomeric polycarbonate. Also desirable within this range is an amount of less than or equal to about 90 wt %, preferably less than or equal to about 85 wt % of the total weight of the oligomeric polycarbonate. Subsequent transesterification at elevated temperature and/or reduced pressure results in polycarbonate products, which are substantially free of residual organic solvent from the interfacial condensation. The amount of residual solvent is typically less than about 100 ppm (parts per million), preferably less than about 75 ppm, more preferably less than about 50 ppm as measured by current technology.

In another embodiment, the oligomeric species obtained after removing the residual solvent and aqueous base phases from the reaction mixture can be directly fed into an extruder with additional transesterification catalyst and DPC being added to the extruder either at the throat or downstream to form completely polymerized polycarbonates. Further extraction of trace solvent can also be pursued in the extruder by utilizing the appropriate vacuum conditions.

The present method has a number of advantages. The method is readily adaptable to current manufacturing facilities, and results in reduced reactor residence time. Phosgene usage is also improved, as phosgene efficiency is generally lowest at the end of the phosgenation step during the Schotten-Baumann reaction. (often a 2 to 8% excess of phosgene over theoretical is needed). The complicated and inefficient work-up of the prior art is eliminated, the drying step is not needed thereby saving of time as well as eliminating bottlenecks from the process. In addition the typical high temperature, low vacuum conditions used in transesterification result in polycarbonate product substantially free of solvent. Only a small amount of DPC is required, on the order of about 10% of the total polycarbonate production.

The invention is further illustrated by the following non-limiting examples.

EXAMPLE 1

100 grams of BPA were polymerized with phosgene in a mixture of water, methylene chloride and sodium hydroxide. During the polymerization, phenol chainstopper and extra sodium hydroxide were added. The polymerization was stopped after addition of 98% of the theoretical quantity of phosgene needed.

The methylene chloride—polymer mixture was washed with water to remove traces of aqueous base. Subsequently, the methylene chloride was evaporated to yield oligomeric polycarbonate having number average molecular weight $M_n$=6900 grams/mole. Mn was determined by using a gel permeation chromatography (size exclusion HPLC) technique. The temperature of the oligomeric polycarbonate was subsequently raised to 270° C. when further polymerization of the polycarbonate was commenced. After reacting the polycarbonate for 30 minutes at a pressure of 0.375 mm of Hg in the presence of 100 parts per billion NaOH catalyst the product was removed. The final batch temperature was 310° C. The final product i.e. polymeric polycarbonate had a number average molecular weight $M_n$ of 8300 grams/mole.

EXAMPLE 2

26.7 grams of BPA were reacted with phosgene in a mixture of water, methylene chloride and aqueous base. During the reaction, phenol chainstopper in an amount of 0.38 grams and extra aqueous base sodium hydroxide (NaOH) in an amount of 7.6 grams were added. The reaction was stopped after the addition of 80% of the theoretical quantity of phosgene needed for completion of the reaction.

The methylene chloride—polymer mixture was washed with water to remove traces of aqueous base. Subsequently, the methylene chloride was evaporated and 30 grams oligomeric polycarbonate were obtained with a number average molecular weight $M_n$ of 3300 grams/mole. The molecular weight was determined by gel permeation chromatography.

The oligomeric polycarbonate was subsequently melted at 270° C. and was further polymerized at a pressure of 0.375 mm of Hg by reacting the oligomers for 30 minutes in the presence of 100 parts per billion NaOH and 1.94 grams of DPC. The final product had a number average molecular weight of $M_n$ of 5700 grams/mole. The molecular weight was determined by Gel Permeation Chromatography.

It will be understood that each of the elements described above, or two or more together, may also find utility in applications differing from the types described herein. While the Invention has been illustrated and described as embodied in a method for improving the efficiency of the manufacture of polycarbonate compositions, it is not intended to be limited to the details shown, since various modifications and substitutions can be made without departing in any way from the spirit of the present invention. As such, further modifications and equivalents of the invention herein disclosed may occur to persons skilled in the art using no more than routine experimentation, and all such modifications and equivalents are believed to be within the spirit and scope of the invention as defined by the following claims.

We claim:

1. A method for the manufacture of a polycarbonate comprising:

reacting a carbonate precursor with a dihydroxy compound in the presence of an aqueous base in an inert organic solvent optionally containing a molecular weight regulator, to form an oligomeric polycarbonate, wherein the reaction between the dihydroxy compound and the carbonate precursor upon formation of the oligomeric polycarbonate is about 80 to 99% completed;

removing the inert organic solvent and the aqueous base to isolate the oligomeric polycarbonate; and transesterifying the isolated oligomeric polycarbonate to form a polymeric polycarbonate at a temperature and pressure effective to remove trace amounts of residual solvent; wherein the catalyst is sodium hydroxide, lithium hydride, sodium dihydrogen phosphite, caesium dihydrogen phosphate tetramethylphosphonium acetate, tetraethylphosphonium acetate, tetrapropylphosphonium acetate, tetrabutylphosphonium acetate, tetrapentylphosphonium acetate, tetrahexylphosphonium acetate, tetraheptylphosphonium acetate, tetraoctylphosphonium acetate, tetradecylphosphonium acetate, tetradodecylphosphonium acetate, tetratolylphosphonium acetate, tetraphenylphosphonium acetate, tetramethylphosphonium benzoate, tetraethylphosphonium benzoate, tetrapropylphosphonium benzoate, tetraphenylphosphonium benzoate, tetramethylphosphonium formate, tetraethylphosphonium formate, tetrapropylphosphonium formate, tetraphenylphosphonium formate, tetramethylphosphonium propionate, tetraethylphosphonium propionate, tetrapropylphosphonium propionate, tetramethylphosphonium butyrate, tetraethylphosphonium butyrate, tetrapropylphosphonium; or a combinations comprising at least one of the foregoing and is added in an amount of about $1 \times 10^{-9}$ to about $1 \times 10^{-4}$ moles/mole of oligomeric polycarbonate.

2. The method of claim 1, wherein the carbonate precursor carbonyl chloride, carbonyl bromide, the bis-haloformate of a dihydric phenol, the bis-haloformate of bisphenol A, the bis-haloformate of hydroquinone, the bis-haloformate of ethylene glycol, the bis-haloformate of neopentyl glycol, diaryl carbonates, diphenyl carbonate, di(tolyl) carbonate, di(naphthyl) carbonate, or a combinations comprising at least one of the foregoing carbonate precursors.

3. The method of claim 1, wherein the dihydroxy compound is a bisphenol compound having the formula (III)

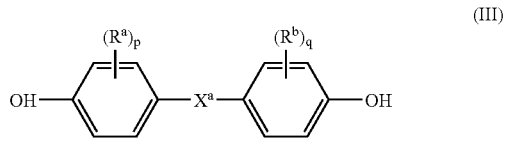

wherein $R^a$ and $R^b$ each represent chlorine, bromine, or a monovalent hydrocarbon group having from 1 to 10 carbon atoms, and are the same or different; p and q are each independently integers 0 to 4 and wherein $X^a$ represents one of the groups of formula (V)

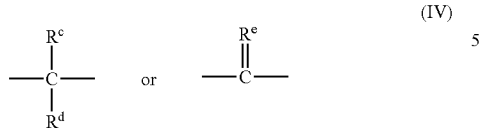
(IV)

wherein $R^c$ and $R^d$ each independently represent a hydrogen atom, a monovalent linear or cyclic hydrocarbon group and $R^e$ is a divalent hydrocarbon group.

4. The method of claim 1, wherein the dihydroxy compound is 1,1-bis(4-hydroxyphenyl) methane, 1,1-bis(4-hydroxyphenyl) ethane, 1,2-bis(4-hydroxyphenyl) propane, 2,2-bis(4-hydroxyphenyl) butane 2,2-bis(4-hydroxyphenyl) octane, 1,1-bis(4-hydroxyphenyl) propane, 1,1-bis(4-hydroxyphenyl) n-butane, bis(4-hydroxyphenyl) phenylmethane, 2,2-bis(4-hydroxy-1-methylphenyl) propane, 1,1-bis(4hydroxy-1-butylphenyl) propane, 2,2-bis (4-hydroxy-3-bromophenyl) propane, 1,1-bis(4-hydroxyphenyl) cyclopentane, 1,1-bis(4-hydroxyphenyl) cyclohexane, or a combination comprising at least one of the foregoing dihydroxy compounds.

5. The method of claim 1, wherein the carbonate precursor is phosgene and the dihydroxy compound is 2,2-bis(4-hydroxyphenyl) propane.

6. The method of claim 1, wherein the aqueous base is sodium hydroxide, potassium hydroxide, calcium hydroxide, triethylamine, a quaternary ammonium compound, a quaternary phosphonium compound pr a combination comprising at least one of the foregoing aqueous bases.

7. The method of claim 1, wherein the molecular weight regulator is phenol, chroman-1, p-t-butylphenol, p-bromophenol, para-cumyl-phenol or a combination comprising at least one of the foregoing molecular weight regulators.

8. The method of claim 1, wherein the solvent is immiscible in water and is selected benzene, toluene, carbon disulfide, dichloromethane, or a combination comprising at least one of the foregoing solvents.

9. The method of claim 1, wherein the aqueous base is sodium hydroxide and the molecular weight regulator is phenol.

10. The method of claim 1, wherein the molecular weight regulator is added in an amount of about 1 to 10 mol % excess measured with respect to the dihydroxy compound.

11. The method of claim 1, wherein the transesterification is carried out at a temperature from 210° C. to about 310° C. and a pressure from about 0.2 to about 20 mm mercury.

12. The method of claim 1, wherein after the organic solvent is removed it is replaced with a higher boiling point solvent having a boiling point greater than 50° C.

13. The method of claim 12, wherein the higher boiling point solvent is phenol, a blend of phenol with diphenyl carbonate and 2,2-bis(4-hydroxyphenyl) propane, a blend of phenol with diphenyl carbonate, or a blend of phenol with 2,2-bis(4-hydroxyphenyl) propane and is added an amount of about 10 to about 100 wt % based on the total weight of the oligomeric polycarbonate.

14. A method for the manufacture of a polycarbonate comprising:
reacting a carbonate precursor with a dihydroxy compound in the presence of an aqueous base in an inert organic solvent containing a molecular weight regulator to form an oligomeric polycarbonate having a mean chain length $P_n$ if less than about 30;
removing the solvent and the aqueous base to isolate the oligomeric polycarbonate; and
transesterifying the isolated oligomeric product in the presence of a catalyst to form a polymeric polycarbonate having a mean chain length $P_n$ of greater than or equal to about 30 at a temperature and pressure at which trace amounts of residual solvents are removed; wherein the catalyst is sodium hydroxide, lithium hydride, sodium dihydrogen phosphite, caesium dihydrogen phosphate tetramethylphosphonium acetate, tetraethylphosphonium acetate, tetrapropylphosphonium acetate, tetrabutylphosphonium acetate, tetrapentylphosphonium acetate, tetrahexylphosphonium acetate, tetraheptylphosphonium acetate, tetraoctylphosphonium acetate, tetradecylphosphonium acetate, tetradodecylphosphonium acetate, tetratolylphosphonium acetate, tetraphenylphosphonium acetate, tetramethylphosphonium benzoate, tetraethylphosphonium benzoate, tetrapropylphosphonium benzoate, tetraphenylphosphonium benzoate, tetramethylphosphonium formate, tetraethylphosphonium formate, tetrapropylphosphonium formate, tetraphenylphosphonium formate, tetramethylphosphonium propionate, tetraethylphosphonium propionate, tetrapropylphosphonium propionate, tetramethylphosphonium butyrate, tetraethylphosphonium butyrate, tetrapropylphosphonium; or a combinations comprising at least one of the foregoing and is added in an amount of about $1 \times 10^{-9}$ to about $1 \times 10^{-4}$ moles/mole of oligomeric polycarbonate.

15. The method of claim 14, wherein the carbonate precursor is a carbonyl oalide, carbonyl chloride, carbonyl bromide, the bis-haloformate of a dihydric phenol, the bis-haloformate of bisphenol A, the bis-haloformate of hydroquinone, the bis-haloformate of ethylene glycol, the bis-haloformate of neopentyl glycol, diaryl carbonate, diphenyl carbonate, di(tolyl) carbonate, di(naphthyl) carbonate, or a combination comprising at least one of the foregoing carbonate precursors.

16. The method of claim 14, wherein the dihydroxy compound is a bisphenol compound having the formula (III)

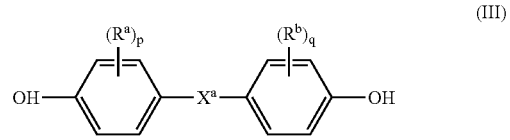
(III)

wherein $R^a$ and $R^b$ each represent chlorine, bromine, or a monovalent hydrocarbon group having from 1 to 10 carbon atoms, and are the same or different; p and q are each independently integers 0 to 4 and wherein $X^a$ represents one of the groups of formula (IV)

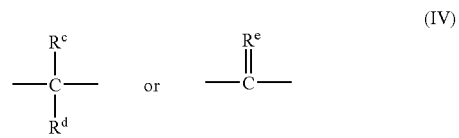
(IV)

wherein $R^c$ and $R^d$ each independently represent a hydrogen atom, a monovalent linear or cyclic hydrocarbon group and $R^e$ is a divalent hydrocarbon group.

17. The method of claim 14, wherein the dihydroxy compound is 1,1-bis(4-hydroxyphenyl) methane, 1,1-bis(4-hydroxyphenyl) ethane, 1,2-bis(4-hydroxyphenyl) propane, 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, bis(4-hydroxyphenyl) phenylmethane, 2,2-bis(4-hydroxy-1-methylphenyl) propane, 1,1-bis(4-hydroxy-butylphenyl) propane, 2,2-bis (4-hydroxy-3-bromophenyl) propane, 1,1-bis(4-hydroxyphenyl) cyclopentane, 1,1-bis(4-hydroxyphenyl) cyclohexane or a combination comprising at least one of the foregoing dihydroxy compounds.

18. The method of claim 14, wherein the carbonate precursor is phosgene and the dihydroxy compound is 2,2-bis(4-hydroxy-1-methylphenyl) propane.

19. The method of claim 14, wherein the aqueous base is sodium hydroxide, potassium hydroxide, calcium hydroxide, triethylamine, a quaternary ammonium compound, a quaternary phosphonium compound, or a combination comprising at lease one of the foregoing aqueous bases.

20. The method of claim 14, wherein the molecular weight regulator is a phenol, chroman-1, p-t-butylphenol, p-bromophenol, para-cumyl-phenol or a combination comprising at least one of the foregoing molecular weight regulators.

21. The method of claim 14, wherein the solvent is immiscible in water and is selected benzene, toluene, carbon disulfide, dichloromethane, or a combination comprising at least one of the foregoing solvents.

22. The method of claim 14, wherein the aqueous base is sodium hydroxide and the molecular weight regulator is phenol.

23. The method of claim 14, wherein the molecular weight regulator is added in an amount of about 1 to about 10 mol % excess measured with respect to the dihydroxy compound.

24. The method of claim 14, wherein the transesterification is carried out at a temperature from 210° C. to about 310° C. and a pressure from about 0.2 mm mercury to about 20 mm mercury.

25. The method of claim 13, wherein after the organic solvent is removed, it is replaced with a higher boiling point solvent having a boiling point greater than 50° C.

26. The method of claim 25, wherein the higher boiling point solvent is phenol, a blend of phenol with diphenyl carbonate and 2,2-bis(4-hydroxyphenyl) propane, a blend of phenol with diphenyl carbonate, or a blend of phenol with 2,2-bis(4-hydroxyphenyl) propane.

27. A method for the manufacture of a polycarbonate, which comprises:
reacting a carbonate precursor with a dihydroxy compound in the presence of an aqueous base in an inert organic solvent containing a molecular weight regulator to form an oligomeric polycarbonate having a mean chain length $P_n$ of less than about 30;
removing the solvent and the aqueous base from the oligomeric polycarbonate;
replacing the solvent with a high boiling point solvent selected from the group consisting of phenol, blends of phenol with diphenyl carbonate and blends of phenol with 2,2-bis(4-hydroxyphenyl) propane and diphenyl carbonate in an amount of about 10 to about 100 wt % based on the weight of the oligomeric polycarbonate; and
transesterifying the oligomeric polycarbonate in the presence of a catalyst to form a polymeric polycarbonate having a mean chain length $P_n$ of greater than or equal to about 30 at a temperature and pressure at which trace amounts of residual solvents are removed; wherein the catalyst is sodium hydroxide, lithium hydride, sodium dihydrogen phosphite, caesium dihydrogen phosphate tetramethylphosphonium acetate, tetraethylphosphonium acetate, tetrapropylphosphonium acetate, tetrabutylphosphonium acetate, tetrapentylphosphonium acetate, tetrahexylphosphonium acetate, tetraheptylphosphonium acetate, tetraoctylphosphonium acetate, tetradecylphosphonium acetate, tetradodecylphosphonium acetate, tetratolylphosphonium acetate, tetraphenylphosphonium acetate, tetramethylphosphonium benzoate, tetraethylphosphonium benzoate, tetrapropylphosphonium benzoate, tetraphenylphosphonium benzoate, tetramethylphosphonium formate, tetraethylphosphonium formate, tetrapropylphosphonium formate, tetraphenylphosphonium formate, tetramethylphosphonium propionate, tetraethylphosphonium propionate, tetrapropylphosphonium propionate, tetramethylphosphonium butyrate, tetraethylphosphonium butyrate, tetrapropylphosphonium; or a combinations comprising at least one of the foregoing and is added in an amount of about $1\times10^{-9}$ to about $1\times10^{-4}$ moles/mole of oligomeric polycarbonate.

28. The method of claim 27, wherein the carbonate precursor is phosgene and the dihydroxy compound is 2,2-bis(4-hydroxyphenyl) propane.

29. The method of claim 27, wherein the aqueous base is sodium hydroxide, potassium hydroxide, calcium hydroxide, triethylamine, a quaternary ammonium compound, quaternary phosphonium compound, or a combination comprising at least one of the foregoing aqueous bases, and wherein the molecular weight regulator is phenol, chroman-1, p-t-butylphenol, p-bromophenol, para-cumyl-phenol, or a combination comprising at least one of the foregoing molecular weight regulators.

30. The method of claim 27, wherein the solvent is immiscible in water and is benzene, toluene, carbon disulfide, dichloromethane, or a combination comprising at least one of the foregoing solvents.

31. The method of claim 27, wherein the aqueous base is sodium hydroxide and the molecular weight regulator is phenol.

32. The method of claim 27, wherein after the organic solvent is removed, it is replaced with a higher boiling point solvent having a boiling point greater than 50° C.

33. The method of claim 32, wherein the higher boiling point solvent is phenol, a blend of phenol with diphenyl carbonate and 2,2-bis(4-hydroxyphenyl) propane, a blend of phenol with diphenyl carbonate, or a blend of phenol with 2,2-bis(4-hydroxyphenyl) propane.

* * * * *